United States Patent [19]

ap Rhys

[11] 4,093,950
[45] June 6, 1978

[54] MOTION-COMPENSATION ARRANGEMENTS FOR MTI RADARS

[75] Inventor: Tomos L. ap Rhys, Ellicott City, Md.

[73] Assignee: The United States of America as represented by the Secretary of the Navy, Washington, D.C.

[21] Appl. No.: 797,209

[22] Filed: May 16, 1977

[51] Int. Cl.² ............................................. G01S 9/42
[52] U.S. Cl. ................................................... 343/7.7
[58] Field of Search ........................... 343/7.7, 9, 5 ST

[56] References Cited

U.S. PATENT DOCUMENTS

| | | | |
|---|---|---|---|
| 3,735,399 | 5/1973 | Sletten et al. | 343/7.7 |
| 3,735,400 | 5/1973 | Sletten et al. | 343/7.7 |
| 3,806,924 | 4/1974 | Applebaum | 343/7.7 |
| 3,879,729 | 4/1975 | Nevin | 343/7.7 X |
| 3,882,498 | 5/1975 | McGuffin | 343/7.7 X |
| 3,968,490 | 7/1976 | Gostin | 343/7.7 |

Primary Examiner—Malcolm F. Hubler
Attorney, Agent, or Firm—R. S. Sciascia; Philip Schneider; William C. Daubenspeck

[57] ABSTRACT

The effects of platform motion or antenna scanning in radar systems of the moving-target-indicator type are compensated for by arrangements which use difference-channel signals to correct sum-channel signals for the changes in phase and amplitude of the backscattered sum-channel signals due to the platform motion and antenna scanning, respectively. Clutter-canceller arrangements having motion compensation at each stage of cancellation and an arrangement for providing a large number (N) of motion-compensated signals which are synchronized in time and phase are shown.

9 Claims, 9 Drawing Figures

FIG. 7
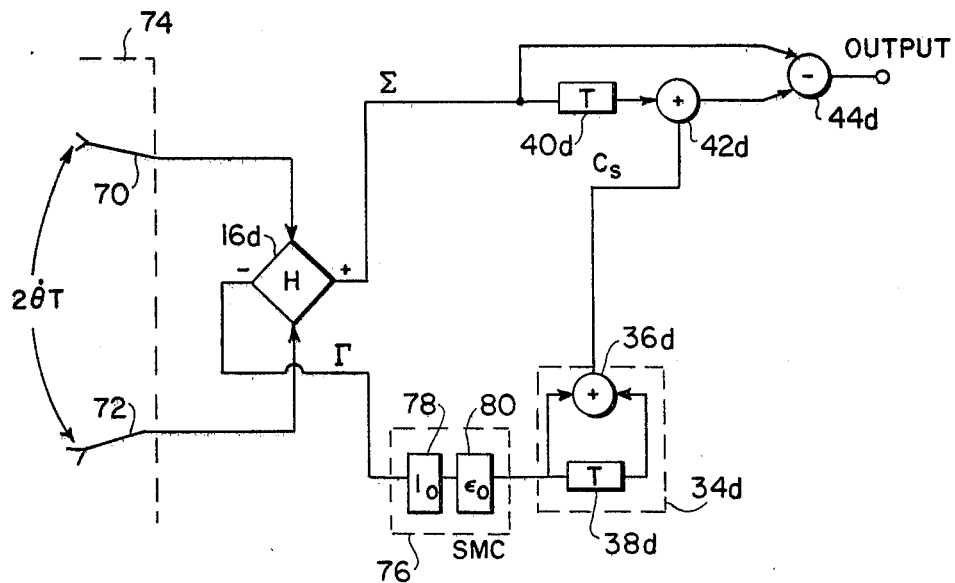
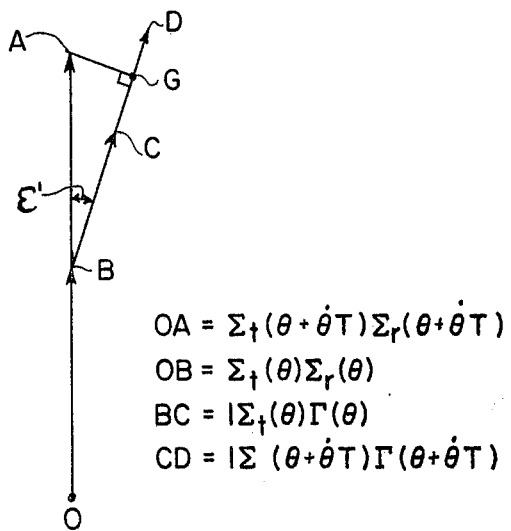
$OA = \Sigma_t(\theta+\dot{\theta}T)\Sigma_r(\theta+\dot{\theta}T)$
$OB = \Sigma_t(\theta)\Sigma_r(\theta)$
$BC = |\Sigma_t(\theta)\Gamma(\theta)$
$CD = |\Sigma(\theta+\dot{\theta}T)\Gamma(\theta+\dot{\theta}T)$
FIG. 8

MOTION-COMPENSATION ARRANGEMENTS FOR MTI RADARS

BACKGROUND OF THE INVENTION

This invention relates generally to radar systems of the moving-target-indicator type and, more particularly, to arrangements which compensate for the effects of platform motion or antenna scanning in such radar systems.

A coherent moving-target-indicator (MTI) radar system uses the doppler characteristic present in the backscattered radar pulse to distinguish between the returns from moving targets and those from stationary objects or clutter. In a stationary system, the spectral content of a received signal due to clutter is essentially the same as that of the transmitted pulse and only the spectral content of a received signal due to a moving target has a Doppler shift. However, in an airborne moving target indicator (AMTI) system, the clutter sources move relative to the radar platform so that the signals originating from them exhibit a Doppler shift. Consequently, both the clutter spectra and the moving target exhibit a Doppler shift in frequency as a function of platform velocity. In addition, the MTI detection problem is also complicated by the scanning motion of the radar antenna. The antenna rotation causes the received signals to experience an amplitude modulation because the signal gain changes as the antenna beam moves relative to the positions of the scatterers.

As is well known, platform-motion effects may be compensated by physically or electronically displacing the antenna's phase center along the plane of its aperture. A first pulse is transmitted and received with the antenna having its phase center at a location P1. A second pulse is transmitted and received with the antenna having its phase center at a location P2. With exact compensation, these phase centers P1 and P2 will be separated by an amount equal to the distance moved by the aircraft during this interpulse period, and so P1 and P2 coincide in space. Then, the signal received in the first channel from any stationary object energized by the first pulse will be identical to the signal received in the second channel on the second pulse. Commonly, it is desirable to leave the transmit antenna fixed with respect to the aircraft and separate the received antennas by twice the distance the aircraft moves in an interpulse period to obtain the same result to a close approximation. With this accomplished, two sets of return signals are available, almost identical with the pair which would be received if the platform were stationary. Techniques based on this principle are known as DPCA-Displaced Phase Center Antenna.

In one implementation of the DPCA technique, as described in Chapter 18 of "Radar Handbook," M. I. Skolnik (Editor), McGraw Hill, 1970, the signal returns are first formed into a sum channel and a difference channel. In first-order terms, if the difference pattern is in quadrature with the sum pattern and is proportional to the sum pattern multiplied by tan $\eta$, where $2\eta$ is the pulse-to-pulse phase advance as seen by the radar receiver due to the platform motion, the difference channel may be used to compensate the sum channel for the effects of the platform motion. The two channels are combined in a hybrid amplifier which produces the sum and difference of the two channels. The clutter is then cancelled by subtracting the sum output of the amplifier, delayed by a time interval equal to the period between radiated pulses, from the difference output of the amplifier.

A similar technique, also described in "Radar Handbook", supra, is used to compensate the sum channel for the effects of the antenna rotation. A difference channel that is in phase with the sum channel and is proportional to the derivative of the sum channel is combined with the sum channel in a hybrid amplifier. The clutter may then be cancelled by subtracting the sum output of the amplifier, delayed by a time interval equal to the period between radiated pulses, from the difference output of the amplifier.

When implementation of such a system is attempted, a question immediately arises as to the choice of sum pattern to give optimal performance. Commonly, a low-sidelobe design has been adopted with the implied assumption that the motion compensation arrangements do not modify the sidelobe characteristics significantly. This is generally invalid, but because low-sidelobe levels have not been achieved in practice, this has not been important. With systems having truly low-sidelobe levels now of practical significance, it is appropriate to consider an optimal design for motion compensation. In addition, motion compensation in conventional cancellers has not been provided beyond the first stage of cancellation, and techniques of accomplishing this are now of practical interest.

Modern systems often call for higher-order processing such as N-pulse coherent integration where, for example, N can be equal to 16. The prior-art motion compensation, as incorporated in the conventional MTI canceller, restricts the system design because the pulses are compensated for motion two at a time and the effects of the motion reappear between pairs. When processing is to be carried out coherently over a large number of pulses, it is advantageous to compensate for motion over this same group of pulses. In principle, these new MTI techniques, such as coherent integration, do not depend on the use of a precanceller (i.e., clutter cancellation as the first stage of MTI processing). Consequently, in addition, techniques of compensating for motion which do not rely on the presence of a pre-canceller are of interest.

SUMMARY OF THE INVENTION

The present invention provides arrangements for compensating the backscattered signals for the effects of platform or scanning motion so that the backscattered signals from a stationary object are synchronized in time and phase. The motion compensation is not limited to two pulses at a time, but may be applied to the number of pulses that is required for the particular MTI processing system. In canceller arrangements, the motion compensation may be applied at each stage of cancellation. The invention also incorporates phase and amplitude adjustments which minimize the effects of antenna constructional errors on the antenna patterns or, alternatively, lead to a relaxation of the antenna constructional tolerances.

In the present invention, antenna sub-arrays are formed to provide similar-shaped receive beams having parallel boresight directions and having phase centers which are separated by approximately 2VT (where V is the component of velocity in the aperture plane and T is the interpulse period) when it is desired to compensate for the effects of platform motion. When it is desired to compensate for antenna scanning, the beams are formed to have boresight directions which are separated by 2ΘT (where Θ is the angular velocity of the antenna) and to have lines of center which intersect at the antenna. The sum and difference of the signals from each two adjacent subarrays (a group) are taken to produce a sum channel and a difference channel for each group of sub-arrays. After adjustment of the difference-channel signals in phase and amplitude, the entering signal (i.e., the most recent signal) in that channel is added to a delayed (for an interpulse) period) signal in that channel to produce a correction signal. The correction signal is then added to a delayed signal in the corresponding sum channel (i.e., the one that corresponds to the difference channel) to provide a signal that is synchronized in time and phase with the entering signal in that sum channel. The synchronized signal may then be subtracted from the entering signal to cancel the clutter.

If N sub-arrays (each providing the appropriate beam) have been formed, N-1 signals are first obtained in each of which the clutter has been cancelled by the (N-1) first stages. Each pair of adjacent signals so provided is then fed to a canceller arrangement identical to the one described above to give (N-2) signals, in each of which the clutter has been cancelled twice. This process is repeated until only one cancelled output in which the clutter has been cancelled N-1 times is available for further processing. The cases N=2 and N=3 are the ones of most practical significance.

An alternative embodiment uses two sub-arrays (as described above) to provide a series of signals which are synchronized in time and phase with the entering signal in the sum channel. The synchronized signal (i.e., synchronized with the entering signal in the sum channel as previously described) is again delayed and added to the correction signal to produce a second synchronized signal. This process may be repeated to provide the desired number of signals that are synchronized in time and phase with the entering signal in the sum channel.

Other advantages and novel features of the invention will become apparent from the following detailed description of the invention when considered in conjunction with the accompanying drawings wherein:

BRIEF DESCRIPTION OF THE DRAWINGS

FIG. 7 is a block diagram of a two-pulse canceller with scanning-motion compensation according to the present invention;

FIG. 8 is a phasor diagram of the system of FIG. 7 illustrating the effects of phase errors in the difference-channel signals.

DESCRIPTION OF THE PREFERRED EMBODIMENT

Figure 1:
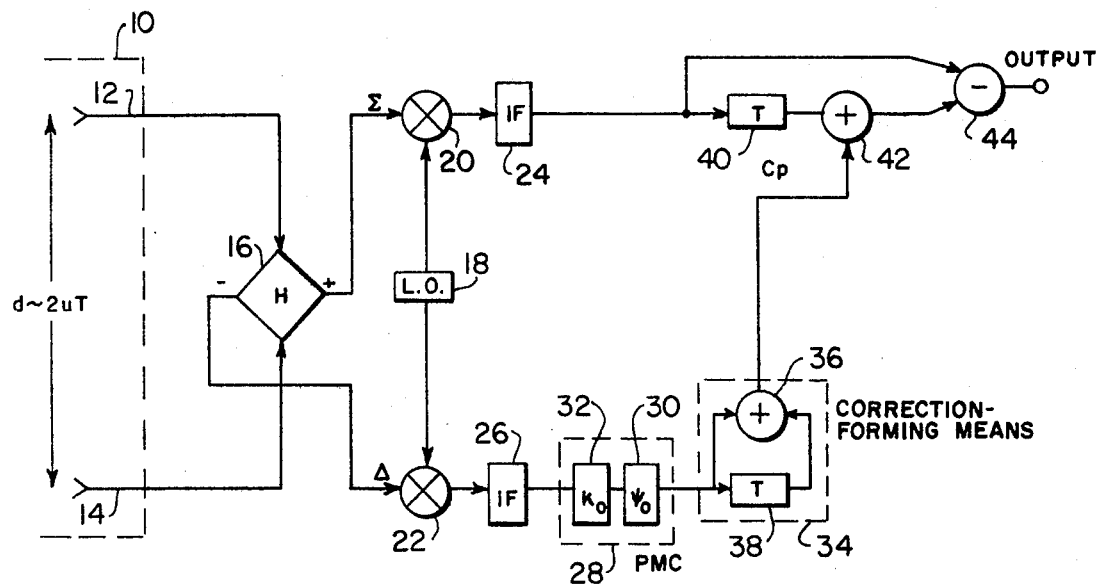
FIG. 1 is a block diagram of a two-pulse canceller with platform-motion compensation according to the present invention.

Referring now to the drawings, wherein like reference characters designate like or corresponding parts throughout the several views and, more particularly to FIG. 1, a system having platform-motion compensation in accordance with the present invention includes antenna 10 for radiating and receiving electromagnetic energy in the form of a series of pulsed RF signals. Two sub-arrays 12 and 14 of the antenna 10 are formed to provide similarly-shaped receive beams that overlap in the horizontal plane, their phase centers being separated by a distance "d" and their boresight directions being parallel. This distance d is chosen to be a little less than the maximum expected value of 2VT, where V is the component of platform velocity in the aperture plane and T is the interpulse period. The sum and difference of these two sub-arrays are taken in hybrid amplifier 16 which forms the sum and difference channel signals of the prior art.

In the prior art, the energy entering the system through the sidelobes is treated as insignificant; on the other hand, the energy entering the system through the mainlobes is compensated for platform motion. This sharp distinction is not made in the present invention, emphasis being placed on the overall performance. As in the prior art, the sum-channel signals are treated as the main signals and the difference-channel signals are treated as auxiliary signals that are used to compensate the sum-channel signals for the effects of platform motion. To a first approximation, neglecting the effects of constructional errors, antenna 10 is characterized by difference-channel signals in quadrature with the sum-channel signals and proportional to the sum-channel signals multiplied by tan $\eta$ where 2 $\eta$ is the pulse-to-pulse phase-advance as seen by the radar due to platform motion.

The RF signals in the sum channel $\Sigma$ and the difference channel $\Delta$ are mixed with the output of local oscillator 18 in mixers 20 and 22 to form IF signals which are amplified in amplifying stages 24 and 26.

The signals in the difference channel $\Delta$ are sent to a platform-motion-compensation (PMC) optimization means 28 that includes a phase adjuster 30 and an amplitude adjuster 32 that introduce corrections to the signals. As will be described hereinafter, PMC optimization means 28 adjusts the difference-channel signals for phase and amplitude deviations from the designed values and adjusts the amplitude by a factor proportional to the backscatter's relative velocity orthogonal to the antenna's boresight.

The output of PMC optimization means 28 is connected to a correction-forming means 34 which includes an addition circuit 36 and a delay circuit 38. The difference-channel signals are sent from PMC optimizing means 28 directly to the addition circuit 36 and also to the delay circuit 38 which subjects the signals to a delay equal to the period between successive radiated pulses (also referred to herein as an interpulse period, T). The delayed signal is fed to the addition circuit 36 which adds the delayed signal and the next undelayed signal to form a correction signal $C_p$ in the difference channel.

The series of IF signals in the sum channel $\Sigma$ are fed to a delay circuit 40, which subjects an input signal to a delay equal to the interpulse period. The delayed sum-channel signal from delay circuit 40 is then combined with the correction signal $C_p$ from the difference channel in an addition circuit 42. The output of addition circuit 42 is a delayed, compensated sum-channel signal which is synchronised in time and phase with the undelayed sum-channel signal from IF amplifier 24. Clutter may be cancelled by subtracting the undelayed sum-channel signal and the delayed, compensated sum-channel signal at subtraction circuit 44.

Figure 2:
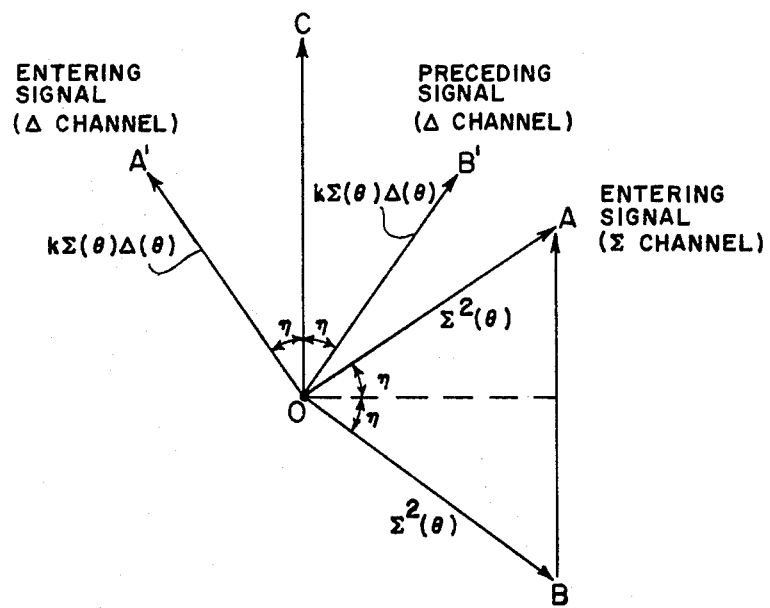
FIG. 2 is a phasor diagram illustrating the platform motion compensation technique of the present invention.

The concept which is the basis of platform motion compensation of the present invention may be better understood with reference to the phase diagram of FIG. 2. For one particular element backscatter, successive signals in the sum channel $\Sigma$ are represented by phasors OB and OA respectively, and differ in phase with respect to each other by angle $2\eta$ due to the motion of the platform. For simplicity, phasors OA and OB are shown so that angle $2\eta$ is bisected by the horizontal axis of the diagram. The entering signal (i.e., the signal now being received) and preceding signal OA' and OB', respectively, in the difference channel $\Delta$ from the same backscatterer are each nominally in quadrature with the corresponding sum-channel signal and differ in phase with respect to each other by angle $2\eta$. The object of the compensation is to bring the preceding signal, OB, in the sum channel from the backscatterer into phase and time synchronization with the entering signal, OA, in the sum channel from the same backscatterer so that the two signals may be cancelled.

Assuming for simplification that the transmit pattern $\Sigma_t(\theta)$ is identical with the receive sum pattern $\Sigma_r(\theta)$ so that the return in the sum channel is proportional to $\Sigma^2(\theta)$ and the return in the difference channel is proportional to $\Sigma^2(\theta)\Delta(\theta)$, the platform motion compensation is accomplished, ignoring the effects of errors for clarity of exposition, as follows:

The entering and preceding signals (OA' and OB') in the difference channel are added to form a correction signal OC which is then added to the preceding signal OB in the sum channel to bring signal OB into synchronism with the entering signal OA in the sum channel. Specifically the signal OA' entering the system in the difference channel is adjusted in amplitude by a scale-factor $k$ proportional to the scatterer's relative velocity orthogonal to the antenna boresight so that the length of phasor OA' is $k\Sigma(\theta)\Delta(\theta)$. This entering adjusted difference-channel signal is added to the preceding adjusted difference-channel signal OB', of length $k\Sigma(\theta)\Delta(\theta)$ to form a correction phasor OC of approximate length $2k\Sigma(\theta)\Delta(\theta)\cos\eta$ in a direction along the vertical axis. (Phasor OC represents the output of correction-forming means 34 in FIG. 1.) From the geometry of FIG. 2, it can be seen that a phasor AB of length $2\Sigma^2(\theta)\sin\eta$ in a direction along the vertical axis may be added to phasor OB to bring the latter phasor into synchronism with phasor OA. If phasor OC equals phasor AB, then phasor OC may be used in place of AB to provide this synchronism. This condition will occur if $$|OC| = |AB|$$

$$2k\Sigma(\theta)\Delta(\theta)\sin\eta = 2\Sigma^2(\theta)\sin\eta$$

$$\Delta(\theta) = 1/k\Sigma(\theta)\tan\eta$$

Since, by design, the difference pattern $\Delta(\theta)$ does have the foregoing relationship to the sum pattern $\Sigma(\theta)$, the correction phasor OC (correction signal $C_p$ in FIG. 1) may be added to phasor OB (the preceding sum-channel signal and the output of delay circuit 40 in FIG. 1) to bring the latter into phase and time synchronization with phasor OA (the entering sum-channel signal). Since phasor OA is equivalent to phasor OB plus phasor OC, the signal from the backscatterer will be cancelled from the sum channel if they are subtracted (in unit 44 in FIG. 1). The signal from moving targets will not be cancelled in general because they will experience an additional phase shift due to the target's motion during the interpulse period.

As noted hereinbefore, the designed antenna patterns cannot be realized perfectly and random constructional errors may degrade system performance. The platform-motion-compensation optimization means 28 introduces phase and amplitude corrections to the difference-channel signal to optimize the motion compensation over the mainlobe. The PMC optimization means 28 may be better understood by reference to the phasor diagram of FIG. 3 which shows the system of FIG. 2 with phase and amplitude errors in the difference-channel signal. The entering and preceding signals in the difference channel, OA' and OB', respectively, are combined to form correction signal OC which is equal to BD and added to the preceding signal in the sum channel OB to bring it into phase synchronism with the entering sum-channel signal OA. As can be seen in the figure, if there are amplitude and phase errors in the system, the compensation is not exact, and a residual phasor AD is produced. Performance may be optimized by minimizing the total power associated with residual phasor AD over the mainlobe region. The power associated with phasor AD is given by $$P = K \int_{-\pi}^{\pi} |AD|^2 d\theta$$

where K is a constant determined by the impedance across which the output signal is developed.

Figure 3:
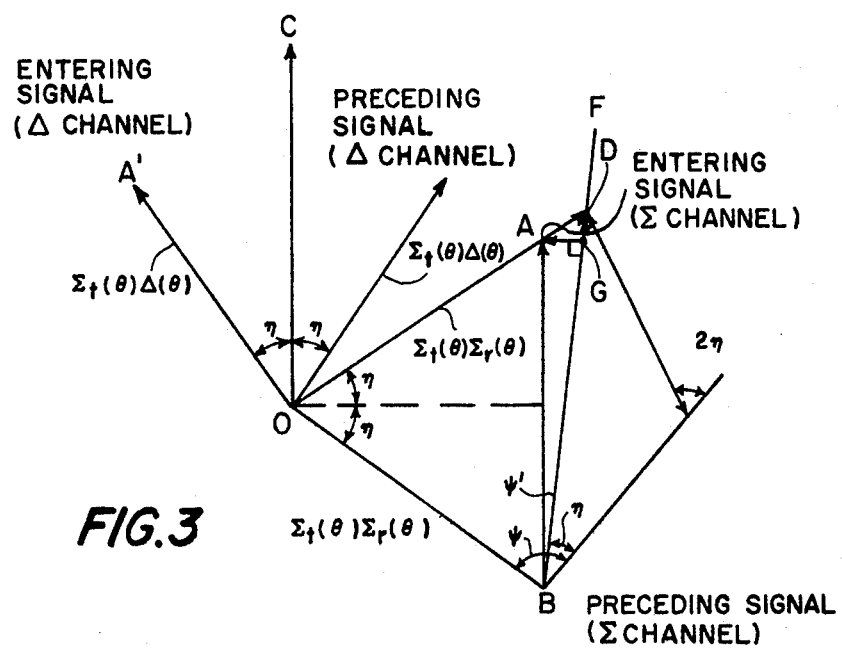
FIG. 3 is a phasor diagram illustrating the system of FIG. 1 with phase errors in the difference-channel signals.

In FIG. 3 the phase characteristic between the sum-channel signal OB and the difference-channel signal OB' is denoted by $\Psi$ and, in general, it differs from the desired value of $\pm\pi/2$ by some phase error $\Psi'$. Geometry shows that as the amplitude of the difference-channel signal is adjusted, point D moves along straight line BGF. Consequently, the residual power P is minimized when point D coincides with point G.

The optimal phase adjustment $\Psi_o$ in the phase characteristic $\Psi$ is then given by $$\psi_o = \frac{1}{2}\tan^{-1}\frac{\int_{-\pi}^{\pi}\overset{2}{\Sigma}(\theta)\overset{2}{\Sigma}(\theta)\sin^2\eta\sin2\psi d\theta}{\int_{-\pi}^{\pi}\overset{2}{\Sigma}(\theta)\overset{2}{\Sigma}(\theta)\sin^2\eta\cos2\psi d\theta}$$

and the optimal amplitude scale-factor $k_o$ is then $$k_o = \frac{1}{2}\frac{\int_{-\pi}^{\pi}\overset{2}{\Sigma}(\theta)\Sigma(\theta)\Delta(\theta)\sin2\eta\sin(\psi-\psi_o)d\theta}{\int_{-\pi}^{\pi}(\Sigma(\theta)\Delta(\theta))^2 d\theta}$$

It will be noted that the embodiment of FIG. 1 compensates the backscattered signals for the effects of platform motion in two-pulse groups and provides a single stage of cancellation. The embodiment of FIG. 4 extends the platform-motion compensation technique of the present invention to the compensation of three-pulse groups to form a double canceller with double compensation of platform motion. Three sub-arrays 52, 54 and 56 of antenna 50 are formed to provide similarly-shaped receiving beams that overlap in the horizontal plane, their phase centers being separated by a distance "$d$" and their boresight directions being parallel. This distance $d$ is chosen in the same manner as in the 2-pulse system of FIG. 1 (i.e., a little less than the maximum expected value of 2VT). The three sub-arrays 52, 54 and 56 are used two at a time in the same way as the two sub-arrays are used in the two-pulse system; that is, the sum and difference of sub-arrays 52 and 54 are taken in hybrid amplifier 16a to form a sum-channel $\Sigma_1$ and a difference channel $\Delta_1$, and the sum and difference of sub-arrays 54 and 56 are taken in hybrid amplifier 16b to form a sum channel $\Sigma_2$ and a difference channel $\Delta_2$. Signals in the $\Sigma_1$ channel are compensated for platform-motion by the signals in the $\Delta_1$ channel and the clutter is cancelled as in the 2-pulse canceller of FIG. 1; likewise, signals in the $\Sigma_2$ channel are compensated for platform-motion by the signals in the $\Delta_2$ channel and the clutter cancelled. The two cancelled outputs are then applied to another 2-pulse canceller of the same configuration as that of FIG. 1 to provide the second stage of cancellation with compensation.

More specifically, the RF signals from sub-arrays 52, 54 and 56 are fed to the hybrid amplifiers to provide the required sum and difference-channel signals. These are then converted to IF signals by conventional mixing techniques (as shown in FIG. 1 but omitted from FIG. 4 for simplicity). The signals in each difference channel $\Delta_1$ and $\Delta_2$ are then sent to a PMC optimization means 28a, 28b, which introduces corrections to the phase and amplitude as previously discussed in connection with PMC optimization means 28. The output of each PMC optimization means 28a, 28b, is sent to a correction-forming means 34a, 34b, which functions in the same manner as the correction-forming means 34 of FIG. 1.

The IF signals in each sum channel $\Sigma_1(\Sigma_2)$ are fed to a delay circuit 40a (40b) and to a subtraction circuit 44a (44b). The output of the correction-forming means 34a (34b) and the output of the delay circuit 40a (40b) are combined in an addition circuit 42a (42b) and the output of the latter is applied to the subtraction circuit 44a (44b). The output of each addition circuit 42a (42b) is a delayed sum-channel signal which has been compensated for platform motion and the output of the subtraction circuit 44a (44b) is a sum-channel signal in which the clutter has been cancelled.

The $\Sigma_1$-channel signal from subtraction circuit 44a and the $\Sigma_2$-channel signal from subtraction circuit 44b and applied as inputs to a two-pulse canceller as described in FIG. 1. Specifically, the sum and difference of the two signals are taken in hybrid amplifier 16c forming a sum-channel $\Sigma_3$ and a difference channel $\Delta_3$. The $\Delta_3$-channel signals are fed through a PMC optimization means 28c and a correction-forming means 34c. The $\Sigma_3$-channel signals are fed to a subtraction circuit 44c, and via a delay circuit 40c, to an addition circuit 42c where they are combined with the output of correction-forming means 34c. The output of addition circuit 42c is fed to the subtraction circuit 44c where the delayed compensated $\Sigma_3$-channel signal is subtracted from an undelayed $\Sigma_3$-channel signal.

It should be apparent that the technique of the present invention can provide higher-order cancellers (with platform-motion compensation at each stage of cancellation) by adding additional sub-arrays, and cancelling in the manner of the two-pulse canceller of the present invention. The outputs of the two-pulse cancellers are then treated as input signals to a second group of two-pulse cancellers. Each two adjacent channels are formed into sum and difference channels and cancelled. The process is repeated until a single compensated sum-channel signal is available at the system output.

Figure 5:
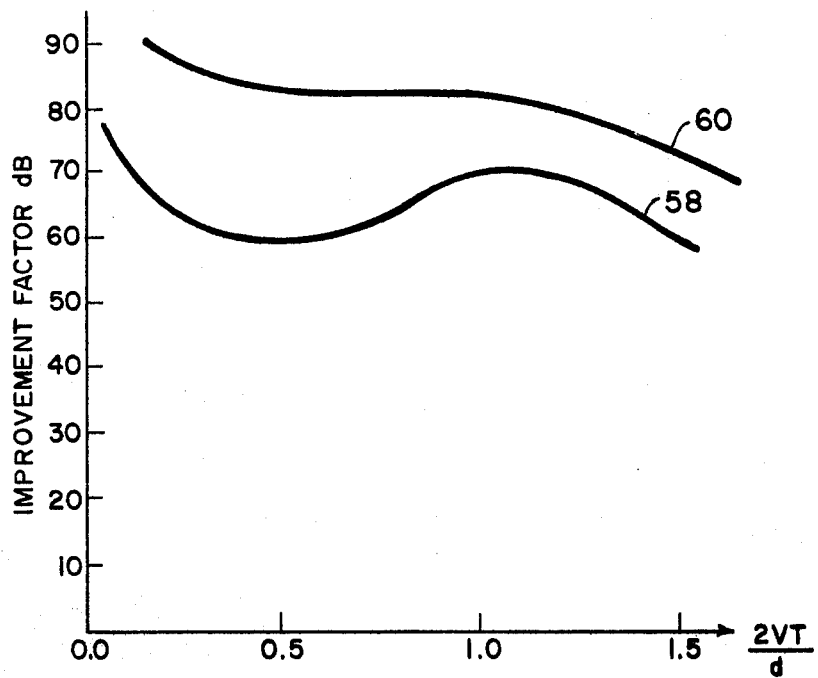
FIG. 5 illustrates the performance achievable by the systems of FIGS. 1 and 4 when immersed in a uniform nonstochastic stationary field.

A typical performance characteristic computed for the two-pulse canceller of FIG. 1 with the phase and amplitude corrections inserted and for operation in a uniform non-stochastic field is shown by curve 58 in FIG. 5. This characteristic is useful in assessing the impact of the antenna on the performance of such a system operating in a real environment. The residual power (uncancelled clutter) is shown as a function of (2VT/$d$) where $d$ is the separation of the phase centers of the two basic sub-arrays. This characteristic refers to the special case where the antenna errors are 5° (peak) in phase and 0.2 db (peak) in amplitude. It is observed that the improvement factor exceeds 60 db over a wide range of (2VT/$d$). Curve 60 shows the performance characteristics for the 3-pulse canceller of FIG. 4. It is observed that the system is tolerant to changes in velocity, with an improvement factor exceeding 70 db over a wide range of (2VT/$d$).

Figure 4:
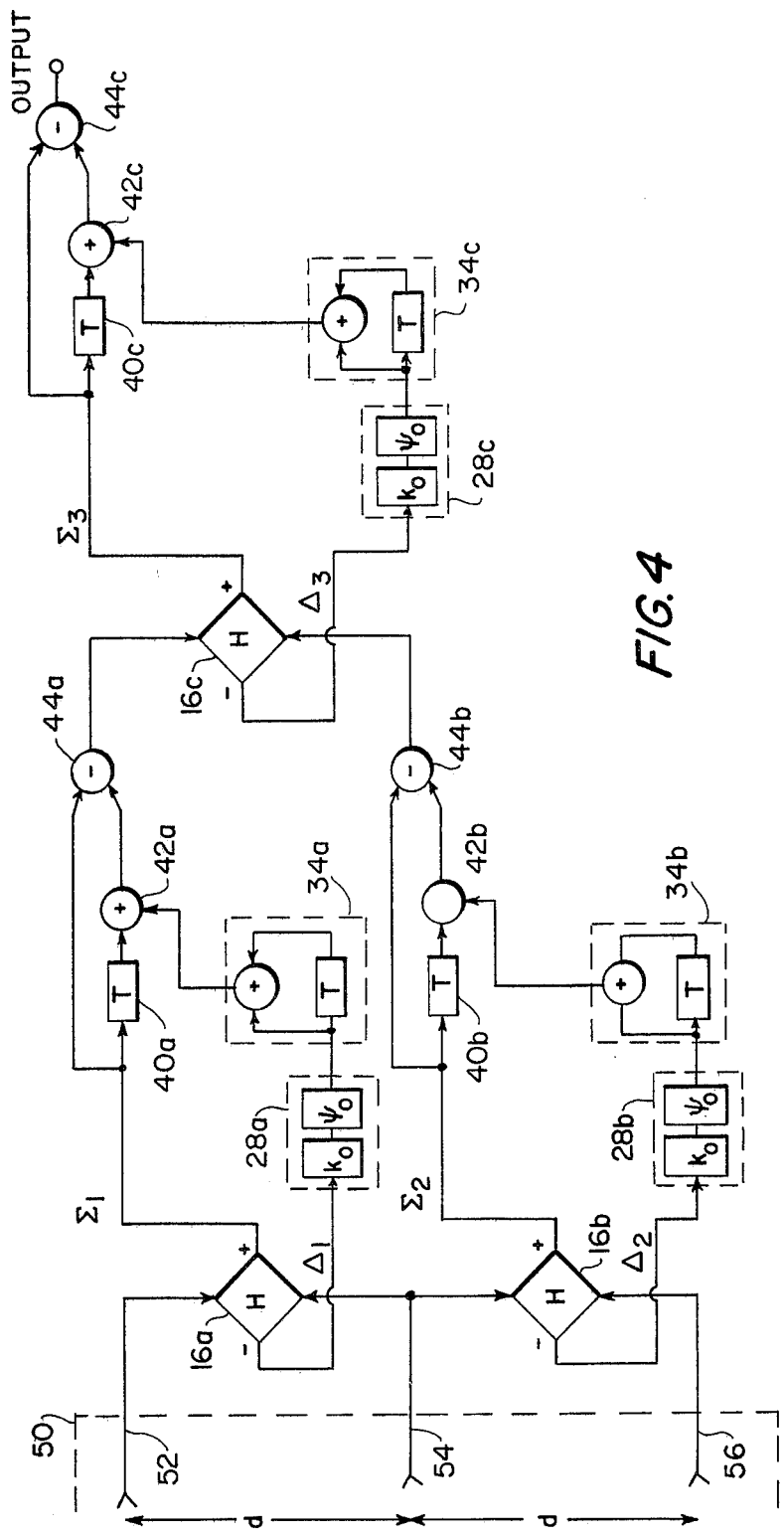
FIG. 4 is a block diagram of a three-pulse canceller with platform-motion compensation according to the present invention.

In principle, optimal platform-motion compensation can be achieved in system where it is desired to compensate for motion over a large number (N) pulses by applying the foregoing technique. However, this may not be feasible because space limitations may cause an unacceptable penalty in antenna gain. Consequently, the two and three pulse systems of FIG. 1 and FIG. 4 are of the most practical significance. However, the embodiment of FIG. 6 provides an alternative arrangement which uses only two sub-arrays and which is applicable to an N-pulse system.

Figure 6:
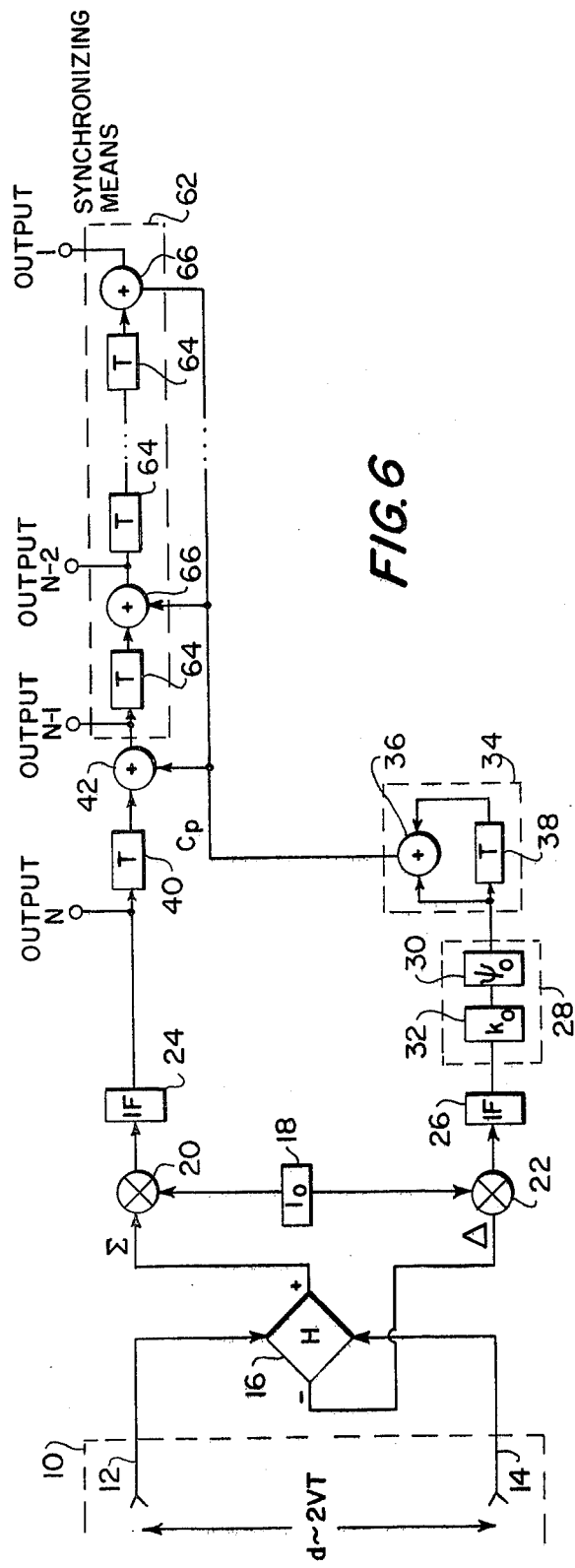
FIG. 6 is a block diagram of an embodiment of the present invention which provides compensation for platform motion over a large number of pulses.

Referring to FIG. 6, the system there shown is identical to the system of FIG. 1 up to and including addition circuit 42 where the correction signal $C_p$ is added to the delayed sum-channel signal to form a delayed, compensated sum-channel signal. In this embodiment, the delayed, compensated sum signal from addition circuit 42 is fed to a synchronizing means 62 which includes a series of delay circuits 64, each delay circuit subjecting an input signal to a delay equal to the period between successive radiated pulses, and a series of addition circuits 66. Each addition circuit 66 has a first input connected to the output of one of the series of delay circuits 64, a second input connected to the output of addition circuit 36, and an output connected to the input of a following delay circuit.

Synchronizing means 62 functions in the following manner. The once-delayed, compensated sum-channel signal from addition circuit 42 is delayed by an inter-pulse period in the first of the series of delay circuits 64, and then fed the first of the series of addition circuits 66 where it is combined with the correction signal $C_p$ from the addition circuit 36 to form a twice-delayed, twice-compensated sum-channel signal that is synchronized in time and phase with both the undelayed sum-channel signal from hybrid amplifier 16 and the once delayed, once compensated sum-channel signal from addition circuit 42. The twice-delayed, twice-compensated signal is in turn delayed and then combined with the correction signal $C_p$. The result is that a group of sum-channel signals that are synchronized in time and phase with the sum-channel signal from hybrid amplifier 16 is produced. Of course the number of synchronized signals available is determined by the number of delay circuits 64 and addition circuits 66 included in the synchronizing means 62.

These synchronized signals may now be used as inputs to MTI systems using techniques in which processing is conducted coherently over a large number of pulses, such as coherent integration. The synchronized signals may also be used as inputs to a clutter canceller. By subtracting each two consecutive signals, a group of signals in which clutter has been cancelled are formed. Each two consecutive signals in this resulting group may then be subtracted and the process repeated until there is only one output available.

Turning next to the embodiment aimed at compensating for the effects of antenna scanning when there is no platform motion present, it should be noted that this is basically easier to achieve with accuracy because the antenna scanning is essentially constant, whereas the quantity of significance in the case of the platform motion is the velocity component in the aperture plane and this varies over a wide range. The scanning-motion compensation may be accomplished by a technique analogous to the platform-motion technique previously described.

FIG. 7 shows a basic two-pulse canceller with compensation for the effects of antenna-scanning according to the present invention. Two sub-arrays 70 and 72 of an antenna 74 are formed to provide similarly shaped receive beams so phased as to point equally on either side, azimuthally, of the transmit antenna's boresight, with a total separation in azimuth angle of $2\dot{\theta}T$ (where $\dot{\theta}$ is the angular velocity of the antenna and T is the interpulse period) and the lines of center of the beams intersect at the antenna. The sum and difference of these two are then formed in a hybrid amplifier 16d to provide main and auxiliary channels, denoted herein as $\Sigma$ and $\Gamma$, respectively. After the signals in both channels are converted to IF frequency by conventional mixing techniques (omitted from FIG. 7 for simplicity), the $\Gamma$- channel signals are fed to a scanning-motion-compensation (SMC) optimization means 76 for introduction of a phase correction $\epsilon_o$ at 78 and an amplitude correction $l_o$ at 80. The functioning of the SMC optimization means 76 will be further described hereinafter in connection with FIG. 8.

A correction signal $C_s$ is formed in a manner identical with that employed for the platform-motion compensation. The $\Gamma$- channel signal from the SMC optimization means 76 is fed to a correction-forming means 34d which includes an addition circuit 36d and a delay circuit 38d. A $\Gamma$- channel signal, delayed by an interpulse period in delay circuit 38d, is added to the next undelayed $\Gamma$- channel signal in addition circuit 36d to form the correction signal $C_s$.

The series of IF signals in the sum channel $\Sigma$ are fed to a delay circuit 40d which subjects input signals to a delay equal to the interpulse period. The delayed sum-channel signal from delay circuit 40d is then combined with the correction signal $C_s$ from the difference channel in an addition circuit 42d. The output of addition circuit 42d is a delayed, compensated sum-channel signal which is synchronized in time and phase with the undelayed sum-channel signal from hybrid amplifier 16d. Clutter may be cancelled by subtracting the undelayed sum-channel signal and the delayed compensated sum-channel signal at subtraction circuit 44d.

The phasor diagram for the scanning-motion compensation system of FIG. 7 with errors is shown in FIG. 8. Phasor OB of length $\Sigma_t(\theta)\Sigma_v(\theta)$ represents the preceding signal in the $\Sigma$- channel; phasor OA of length $\Sigma_t(\theta+\dot{\theta}T)\Sigma_v(\theta+\dot{\theta}T)$ represents the entering signal in the $\Sigma$- channel; and phasors BC, of length $l\Sigma_t(\theta)\Gamma(\theta)$, and CD of length $l\Sigma_t(\theta+\dot{\theta}T)\Gamma(\theta+\dot{\theta}T)$ represent the preceding and entering signals in the $\Gamma$- channel, respectively, where $l$ is a scale factor. Due to errors in antenna construction the phase characteristic $\epsilon$ between the $\Sigma$- channel and the $\Gamma$- channel differs from the desired value of zero degrees by some phase error $\epsilon'$. Point G represents the point where the residual power due to incomplete cancellation is minimized. The optimal phase adjustment $\epsilon_o$ and amplitude adjustment $l_o$ in the $\Gamma$- channel signals to minimize the residual power are then given by:

$$\epsilon_o = \frac{1}{2} \tan^{-1} \left\{ \frac{\int_{-\pi}^{\pi} (\delta_1^2 \sin 2\epsilon) d\theta}{\int_{-\pi}^{\pi} (\delta_1^2 \cos 2\epsilon) d\theta} \right\}$$

where $\delta_1 = \Sigma(\theta + \dot{\theta}T)\Sigma(\theta + \dot{\theta}T) - \Sigma(\theta)\Sigma(\theta)$
            $t$            $v$           $t$    $v$ $$l_o = \frac{\int_{-\pi}^{\pi} \delta_1 \delta_2 \cos(\epsilon - \epsilon_o) d\theta}{\int_{-\pi}^{\pi} \delta_2^2 d\theta}$$

where $\delta_2 = \Sigma(\theta + \dot{\theta}T)\Gamma(\theta + \dot{\theta}T) + \Sigma(\theta)\Gamma(\theta)$
            $t$                                $t$ There is little advantage to expanding the antenna-scanning compensation in canceller arrangements therough the use of additional antenna sub-arrays in the manner of FIG. 4 because the first cancellation is generally effective. However, when a pre-canceller is not employed multiple-pulse coherent processing techniques generally require antenna-scanning compensation over a large number of pulses. The embodiment of FIG. 9 is suitable for use with such techniques because is provides a series of signals that have been compensated for antenna scanning so that they are synchronized in time and phase.

Figure 9:
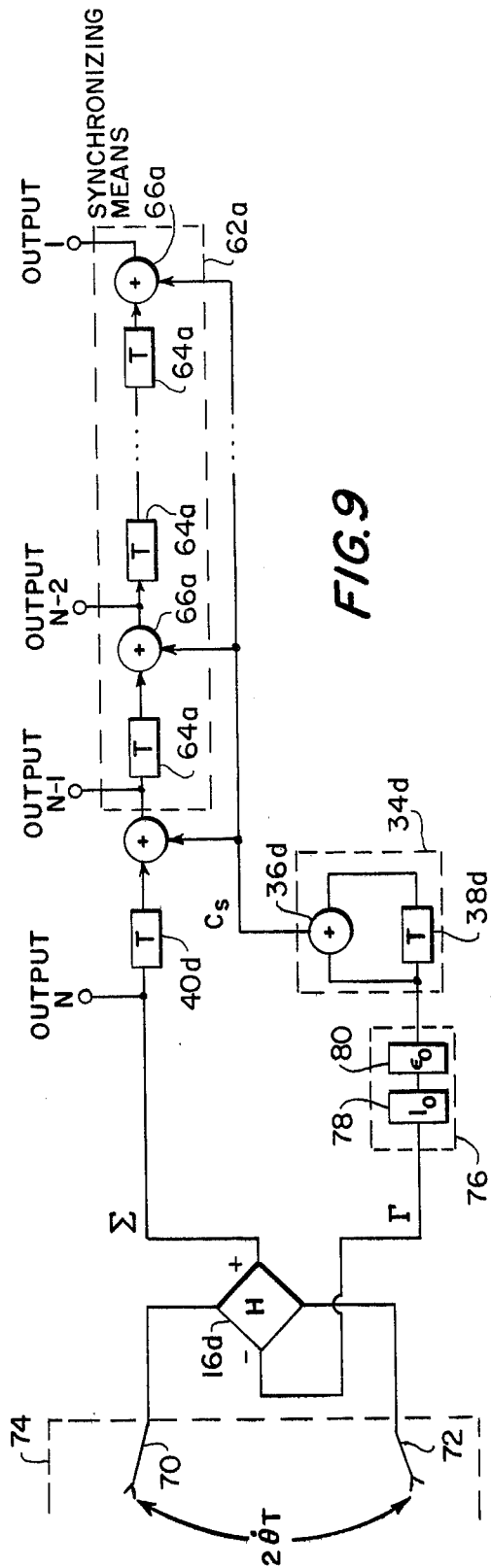
FIG. 9 is a block diagram of an embodiment of the present invention which provides compensation for antenna scanning over a large number of pulses.

Referring to FIG. 9, the system there shown is identical to the system of FIG. 7 up to and including addition circuit 42d where the correction signal $C_s$ is added to the delayed sum-channel signal to form a delayed, compensated sum-channel signal. The delayed, compensated sum signal from addition circuit 42d is fed to a synchronizing means 62a which is identical to the synchronizing means 62 of FIG. 6. In this embodiment, the scanning correction signal $C_s$ is added to each of the series of signals in the $\Sigma$- channel (in the manner previously described in connection with correction signal $C_p$ in FIG. 6) to form a series of $\Sigma$- channel signals synchronized in time and phase with the $\Sigma$- channel signal from hybrid amplifier 16d. These synchronized signals may be used with coherent processing techniques or as inputs to clutter cancellers.

It can be seen that the compensation for the effects of platform motion or antenna scanning as shown by the present invention may provide many synchronized signals for multiple-pulse MTI processing techniques or compensation at each state of cancellation in clutter cancellers.

Obviously, many modifications and variations of the present invention are possible in light of the above teachings. It is therefore to be understood that within the scope of the appended claims, the invention may be practiced otherwise than as described.

What is claimed and desired to be secured by Letters Patent of the United States is:

1. In radar system of the type wherein search pulses are periodically radiated in a directional beam, a system for compensating backscattered signals for the effects of the radar's motion comprising:
   an array antenna for receiving the backscattered signals including first and second sub-arrays for forming similarly-shaped first and second receive beams, the lines of center of said first and second receive beams at the array being separated by a predetermined amount;
   first forming means coupled to said first and second sub-arrays for forming sum and difference outputs of the signals received;
   first optimization means coupled to receive difference signals corresponding to the difference output of said first forming means for adjusting the difference signals in phase and amplitude;
   first correction-forming means receiving the output of said first optimization means as an input, said first correction-forming means delaying its input signal for an interpulse period and adding the delayed input signal to the following input signal to produce a correction signal at its output;
   a first delay circuit coupled to receive sum signals corresponding to the sum output of said first forming means as its input, said first delay circuit delaying its input signal for an interpulse period; and
   a first addition circuit having a first input coupled to the output of said first correction-forming means and a second input coupled to the output of said first delay circuit, the output of said first addition circuit being a signal which in synchronized in time and phase with the signal in the sum output of said first forming means.

2. The system as recited in claim 1, further comprising a synchronizing means which comprises:
   a plurality of delay circuits, each of said plurality of delay circuits delaying an input signal for an interpulse period, the first of said plurality of delay circuits having its input coupled to the output of said first addition circuit; and
   a plurality of addition circuits, each of said plurality of addition circuits having a first input coupled to the output of one of said plurality of delay circuits and a second input coupled to the output of said first correction-forming means,
   said plurality of addition circuits being coupled to said plurality of delay circuits so that an input signal to the first of said plurality of delay circuits is repetitively delayed for an interpulse period and repetitively combined with the output of said first correction-forming means to form a series of signals which are synchronized in time and phase with the signal in the sum output of said first forming means.

3. The system as recited in claim 2, wherein the distance between the lines of center of said first and second receive beams at the array is related to a predetermined linear velocity of the radar and to the interpulse period, the lines of center of said first and second receive beams being parallel.

4. The system as recited in claim 1, wherein the distance between the lines of center of said first and second receive beams at the array is related to a predetermined linear velocity of the radar and to the interpulse period, the lines of center of said first and second receive beams being parallel.

5. The system as recited in claim 4, further comprising a first subtraction circuit having a first input coupled to the sum output of said first forming means and a second input coupled to the output of said first addition circuit, the output of said first subtraction circuit being a signal in which clutter has been cancelled.

6. The system as recited in claim 5 wherein said array antenna further comprises:
   a third sub-array for forming a third receive beam having a shape similar to that of said first and second receive beams, the distance between the lines of center of said second and said third receive beams at the array being related to a pre-determined linear velocity of the radar and to the interpulse period, the lines of center of said second and third receive beams being parallel;
   said system further comprising:
   second forming means coupled to said second and third sub-arrays for forming sum and difference outputs of the received signals;
   second optimization means coupled to receive difference signals corresponding to the difference output of said second forming means for adjusting the difference signals in phase and amplitude;
   second correction-forming means receiving the output of said second optimization means as an input, said second correction-forming means delaying an input signal for an interpulse period and adding the delayed input signal to the following input signal to produce a correction signal at its output;
   a second delay circuit having the sum output of said second forming means as its input, said second delay circuit delaying its input signal for an interpulse period;
   a second addition circuit having a first input coupled to the output of said second correction-forming means and a second input coupled to the output of said second delay circuit, the output of said second addition circuit being a signal which is synchronized in time and phase with the signal in the sum output of said second forming means;
   a second subtraction circuit having a first input coupled to the sum output of said second forming means and a second input coupled to the output of said second addition circuit, the output of said second subtraction circuit being a signal in which clutter has been cancelled;
   a third forming means coupled to receive the outputs of said first and second subtraction circuits for forming sum and difference outputs of the signals received;
   a third optimization means coupled to receive the difference output of said third forming means for adjusting the difference signals in phase and amplitude;
   a third correction-forming means receiving the output of said third optimization means as an input, said third correction-forming means delaying an input signal for an interpulse period and adding the delayed input signal to the following input signal to produce a correction signal at its output;

a third delay circuit having the sum output of said third forming means as its input, said third delay circuit delaying its input signal for an interpulse period;

a third addition circuit having a first input coupled to the output of said third correction-forming means and a second input coupled to the output of said third delay circuit, the output of said third addition circuit being a signal which is synchronized in time and phase with the signal in the sum output of said third forming means; and a third subtraction circuit having a first input coupled to the sum output of said third forming means and a second input coupled to the output of said third addition circuit, the output of said third subtraction circuit being a signal in which clutter has been cancelled.

7. The system as recited in claim 2, wherein the angle between the lines of center of said first and second receive beams is related to the angular velocity of the antenna and to the interpulse period, the lines of center of said first and second receive beams intersecting at the antenna.

8. The system as recited in claim 1, wherein the angle between the lines of center of said first and second receive beams is related to the angular velocity of the antenna and to the interpulse period, and wherein the lines of center of said first and second receive beams intersecting at the antenna.

9. The system as recited in claim 8, further comprising a first subtraction circuit having a first input coupled to the sum output of said first forming means and a second input coupled to the output of said first addition circuit, the output of said first subtraction circuit being a signal in which clutter has been cancelled.

* * * * *